Oct. 30, 1962  F. P. FEHN  3,061,748
VARIABLE SPEED DRIVE MEANS
Filed Oct. 12, 1959  5 Sheets-Sheet 3

INVENTOR
FRANK P. FEHN
BY
Williams, Tillbury & Jolrick
ATTORNEYS

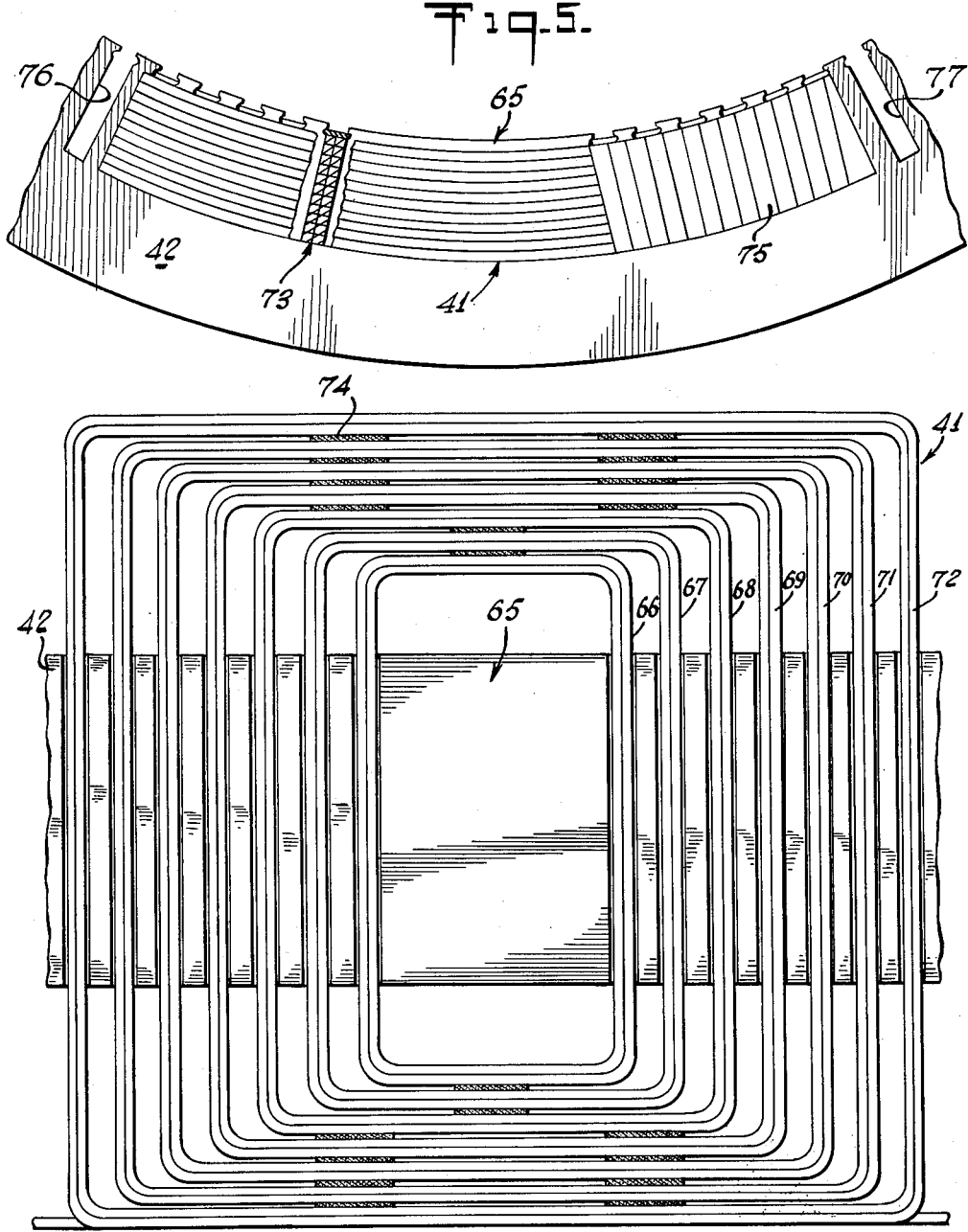

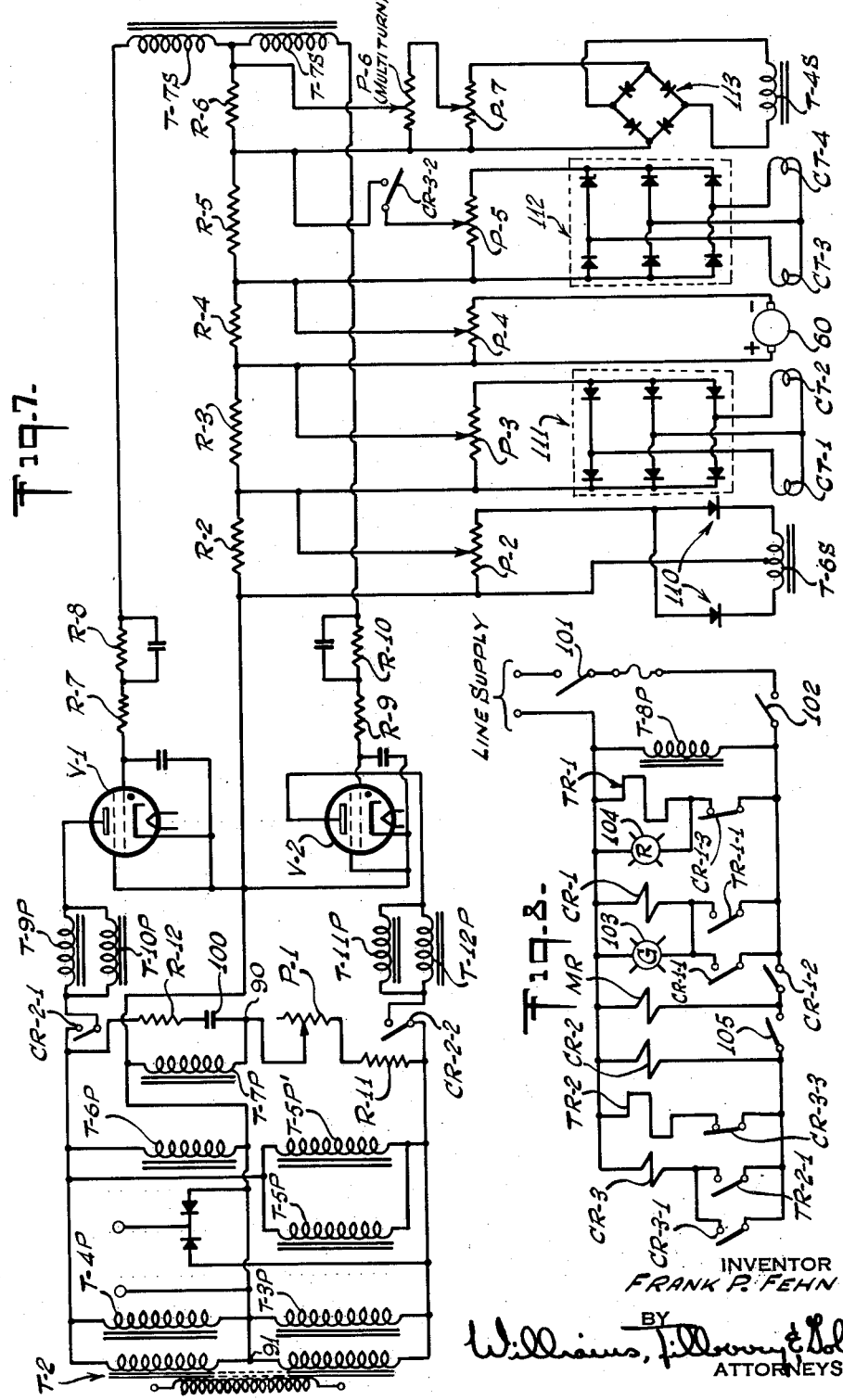

United States Patent Office 3,061,748
Patented Oct. 30, 1962

3,061,748
VARIABLE SPEED DRIVE MEANS
Frank P. Fehn, Canton, Ohio, assignor to E. W. Bliss Company, Canton, Ohio, a corporation of Delaware
Filed Oct. 12, 1959, Ser. No. 845,931
9 Claims. (Cl. 310—98)

This invention relates to a variable-speed coupling device to be interposed between a drive motor and a machine to be driven at variable speeds, as, for example, the spindle of a contour lathe, boring mill, or the like, wherein different depths of cut are to be made at substantially constant cutting speed, meaning that the spindle speed will have to be varied in accordance with the instantaneous depth or radius of cut.

Conventional machine-tool drives, where variable speed is an important factor, are usually of the direct-current type in which an A.-C. motor drives a D.-C. generator, which in turn drives a D.-C. motor on the lathe, boring machine or the like. This general organization additionally requires two D.-C. exciters, and the controls for all of these units become quite bulky and complex. Each of the D.-C. units requires relatively complex windings and associated commutator bars and connections, which are something of a maintenance problem.

It is an object of the invention to provide an improved drive of the character indicated, wherein the complexity and maintenance problems of conventional drives are substantially reduced or avoided.

Another object is to provide a drive of the character indicated characterized by efficient coupling and with complete flexibility of control of the degree of coupling, fully taking into account the instantaneous position and power requirements of a given cutting operation.

It is an object to meet the above objects with a drive incorporating improved means whereby the drive may be automatically sensitive to instantaneous load on various parts of the system, to instantaneous speed development in the output, to instantaneous tool position or cutting radius, and to such other factors as it may be desired to introduce for control purposes.

It is also an object to meet the above objects with a machine drive in which simple manual adjustments may be made for all compensating controls, so that the machine may be readily set up for changes in size and material of the work, and for changes in cutting tool or cutting technique employed.

It is a specific object to meet the above objects with an electromagnetic structure characterized by distributed windings giving higher flux density at pole faces and promoting maximum flux transfer between stator and rotor elements.

A further specific object is to provide structures of the character indicated wherein flux-leakage effects between adjacent poles and mutual inductance between adjacent coils are minimized, and also in which the dead space between adjacent coils is minimized.

Another specific object is to meet the above objects with a device lending itself particularly to rapid accommodation of load fluctuations, while fully protecting the machine.

Other objects and various further features of novelty and invention will be pointed out or will occur to those skilled in the art from a reading of the following specification, in conjunction with the accompanying drawings. In said drawings, which show, for illustrative purposes only, a preferred form of the invention:

FIG. 4 is an enlarged plan-type development of winding means of the invention applied to part of an element of the described mechanism;

FIG. 5 is a fragmentary side view of a winding development for FIG. 4, certain parts being broken away and shown in section; and FIGS. 6, 7, and 8 are electrical circuit diagrams illustrating control circuitry for the drive means of the invention.

Briefly stated, my invention contemplates an improved drive means comprising an electromagnetic coupling device adapted for connection between a continuously running electric motor and a machine, such as a lathe spindle to be driven thereby. The invention features efficient delivery of output torque, with fast response to varying load conditions and to such other factors as it may be desired to inject into the control means for the coupling device. Generally speaking, the coupling device comprises two independently rotatable members mounted on the same axis of rotation and including coacting magnetic elements, preferably developed to optimize the coupling between rotatable members when electrically excited with D.-C.

The excitable magnetizing means may include a part carried by one of the rotatable members for coaction with magnetic induction means carried by the other rotatable member; the magnetizing means includes excitable winding means which may be carried on a non-rotating part of the drive means but which in the form to be described is carried by the one rotatable member and is excited with direct current of magnitude in accordance with the desired coupling coefficient, the other of the rotatable members being of the squirrel-cage variety. The magnitude of coupling coefficient is determined by the instantaneous D.-C. excitation of the winding means, and the invention features a novel phase-shift type control circuit, wherein a plurality of factors are electrically summed to determine the net instantaneous control function; summation (with due regard to sign) takes place in a single feedback-control circuit, governing the net amplitude of instantaneous bias applied to the input signal of a power amplifier, as of the thyratron type.

In application to the lathe drive to be described, each of the compensating or correcting factors appears as a D.-C. voltage across a different one of a plurality of resistors in series. Specifically, these provide (1) a first nominal negative voltage, selectively adjusted to determine maximum permissible clutch action for a particular job setup; (2) a second negative voltage, responsive to coupling current and providing an upper safety limit of coupling torque, regardless of other adjustments; (3) a third negative voltage, responsive to output rotational speed to provide a selected upper limit for driven speed; (4) a positive voltage responsive to motor current and providing increased torque as the load increases, all of course within the upper safety limit mentioned above; and (5) a voltage responsive to tool (or work) position, such voltage increasing positively or decreasing negatively as cutting radius changes, in order to maintain constant cutting speed, regardless of instantaneous radius of cut.

Figure 1:
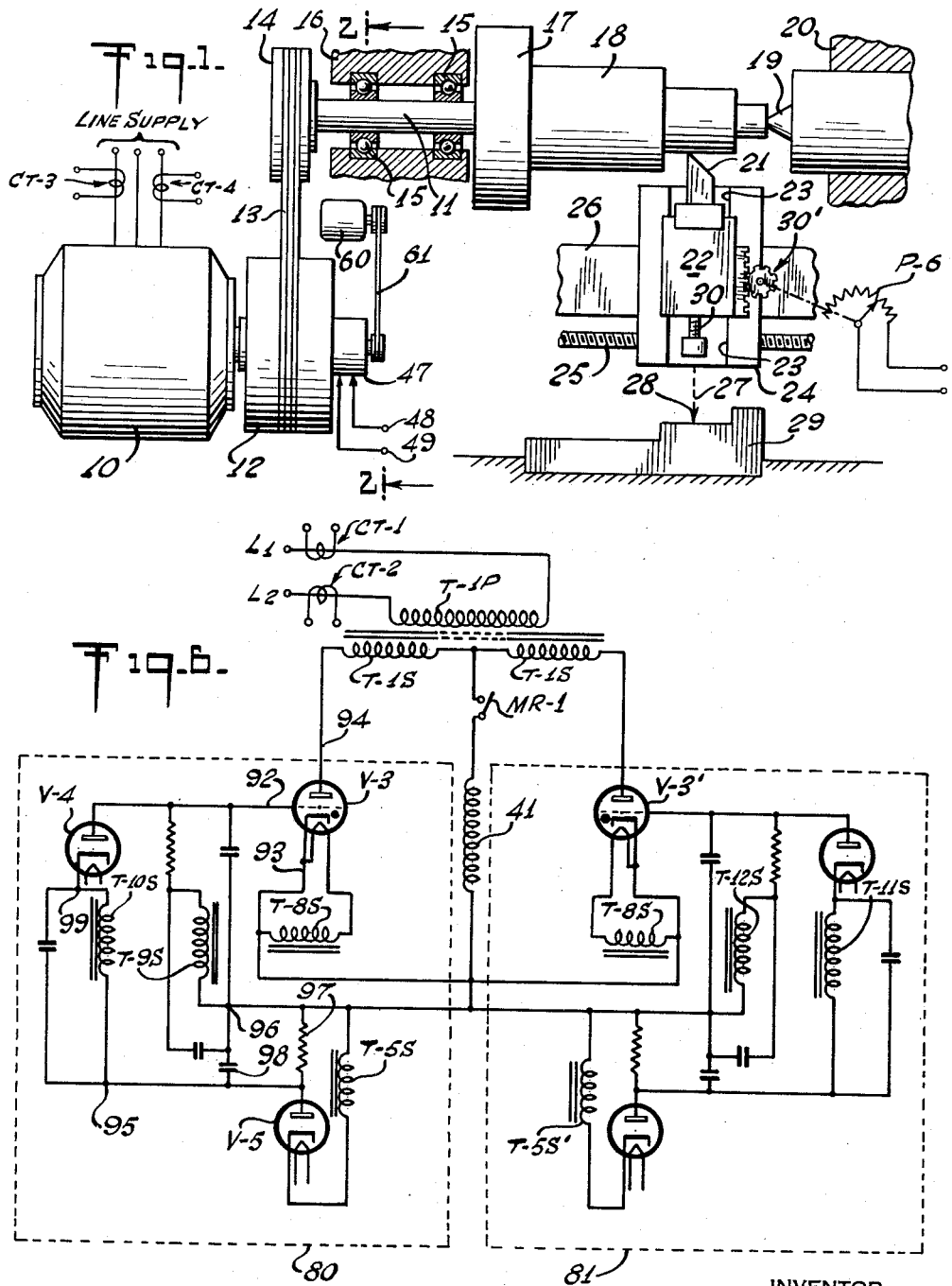
FIG. 1 is a simplified diagram schematically illustrating a contour or profile-following lathe in which a variable-speed drive mechanism of my invention has been incorporated, the electronic control rack being omitted.

Referring to FIG. 1 of the drawings, my invention is shown in application to a lathe-drive mechanism employing a continuously running prime-mover motor 10 coupled in driving relation with the lathe spindle 11 by means 12 of the invention. The coupling device 12 is shown to have an output on the periphery or drum thereof for driving a belt 13 to a pulley 14 on the spindle 11. The spindle 11 is journalled at 15 in the lathe frame 16, and is shown carrying a chuck 17 supporting a piece of work 18. For a profile or contour turning operation, the center 19 in the tail stock 20, mounted at the other end of the machine, supports the opposite end of the piece of work 18.

Cutting operations on the work 18 are performed by a tool 21 carried in a holder or slide 22 radially adjustably mounted on guide means 23 forming part of a lathe carriage or slide 24. Lead-screw feed means 25 serves to drive the slide or carriage 24 along longitudinal ways 26, which may form part of the lathe bed. As indicated generally above, the lathe in question is a profile-cutting lathe and, for this purpose, may employ suitable means, suggested at 27, for operatively connecting a tracer 28 in radial-positioning relation with the tool 21, as by reversibly clutching slide 22 to a continuously driven lead screw (suggested at 30) and carried by slide 24. Drives for lead screws 25–30 form no part of this invention and are therefore not further described. The tracer 28 is shown following various stepped contours of a fixedly supported template 29 to be traversed as the lathe carriage 24 is fed along the lead screw 25. For purposes which will later be clear, the carriage 24 also supports suitable position pick-off means, such as a potentiometer P–6, operated by the tool-positioning lead-screw feed means 30, or, as shown, by rack-and-pinion means 30′, to follow the instantaneous radial placement of the tool 21 and tool holder 22.

Figure 2:
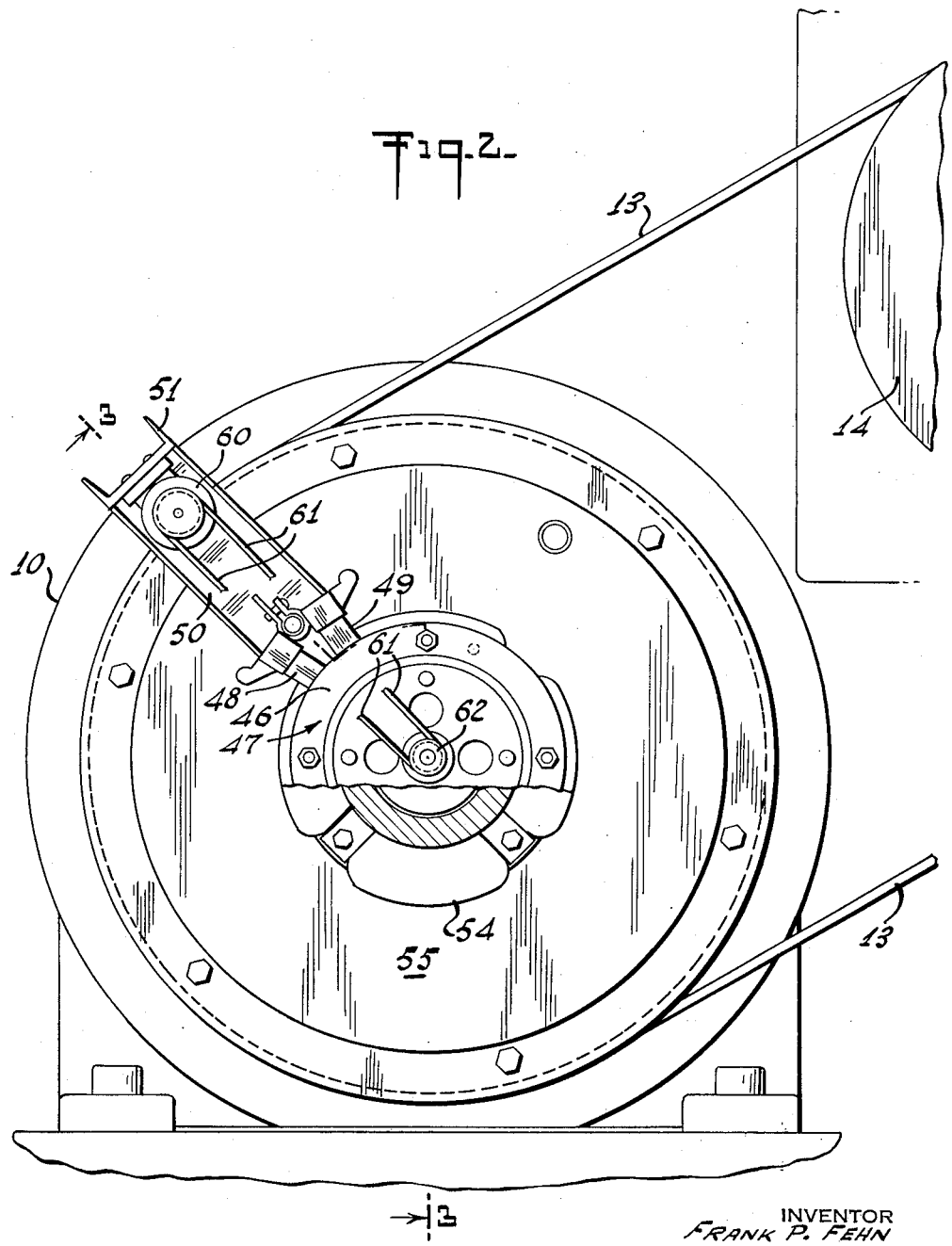
FIG. 2 is a right-end elevation of the drive means of the invention and viewed on an enlarged scale and from the aspect 2—2 of FIG. 1.
Figure 3:
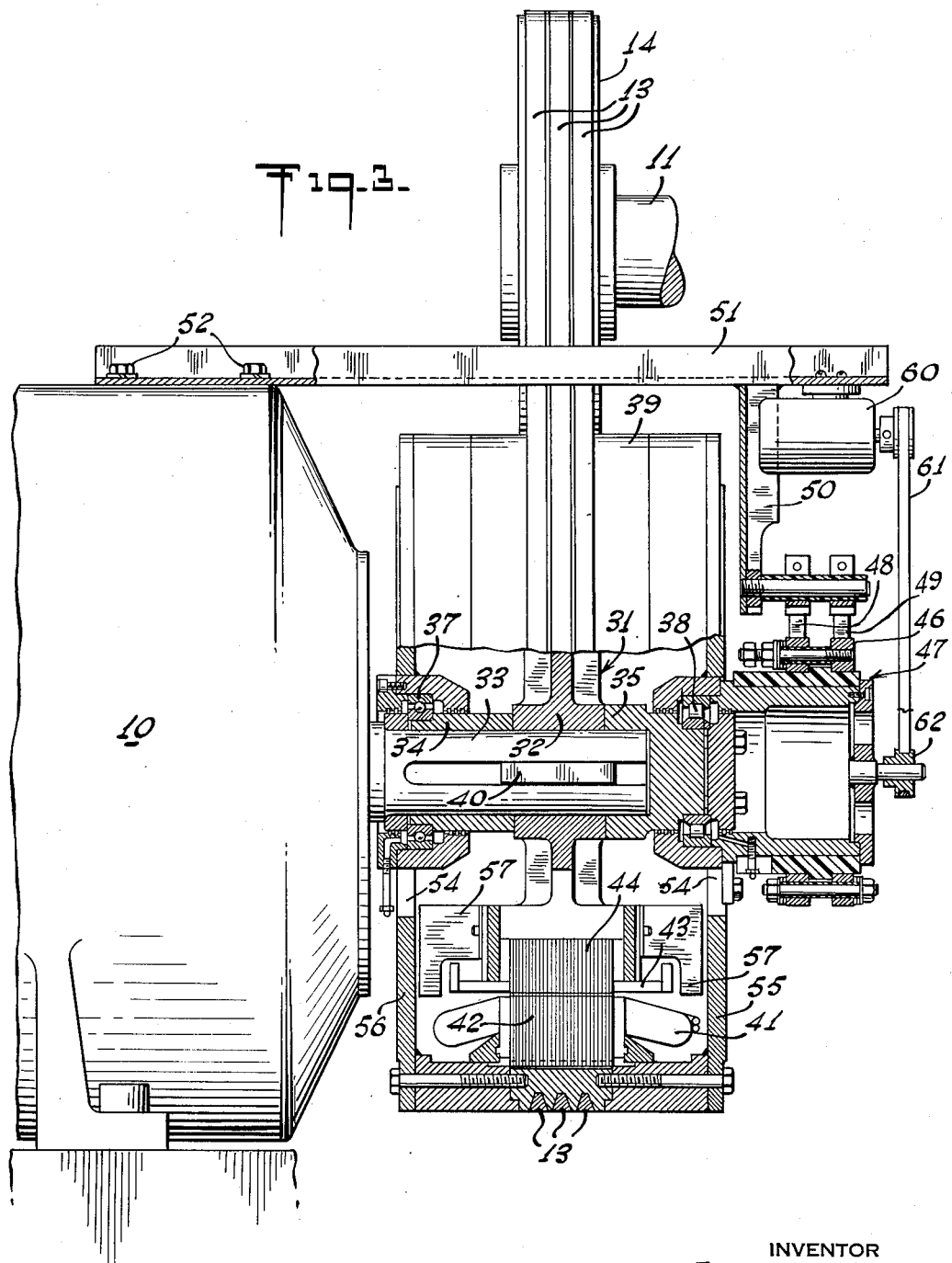
FIG. 3 is a view in side elevation, partly broken away and shown in section, along the lines designated generally 3—3 in FIG. 2.

Referring to FIGS. 2 and 3 of the drawings, the coupling device 12 of the invention is shown to be carried by the motor 10. The coupling device 12 comprises two rotatable members mounted for independent rotation on the same axis, and preferably the rotatable member having greater moment of inertia is disposed to be the output or driven member. It will be understood, however, that for certain applications (e.g. table-position drive for a shaper or planer) where drive reversal is an essential part of the mechanism, it may be preferred to utilize, as the output member, that rotatable member which has lower moment of inertia. Thus, in the arrangement shown, the drive element 31 is of lesser moment of inertia, and includes a hub 32 mounted on the output shaft 33 of the main drive motor 10. Spacers 34—35 are also carried on the shaft 33 and serve to position spaced antifriction bearings 37—38 for the independent rotational support of the outer or driven rotatable member 39. Key means 40 is shown locking the drive member 31 to the motor shaft.

In accordance with the invention, coupling between the relatively rotatable members 31–39 is achieved electromagnetically, and each of these members carries its own core and winding means. In the form shown, excitable windings 41 and core laminations 42 are carried on the outer or driven member 39 (of high moment of inertia), and induction windings 43 and rotor iron 44 are carried on the inner rotatable member 31. The members 43—44 may be of conventional squirrel-cage configuration. Electrical excitation to the winding means 41 is provided by way of slip rings 45—46 carried on an outer boss or hub 47 forming part of the rotor assembly, and suitable brushes 48—49 for contact with the slip rings 45—46 may be carried on bracket means 50 secured to an arm 51 anchored at 52 to the main motor frame.

For cooling purposes, I show a plurality of angularly spaced vent openings 54 in the respective side walls 55—56 forming the frame of the driven member 39. It will be noted that the disclosed structure lends itself to efficient provision of fan blades 57 fixed to the axial ends of the frame of the drive member 31 and in proximity to all windings and to the openings 54. Preferably, the pitch of the blades 57 is such as to induce an axial flow of air, say, from left to right, entering the port 54 in wall 56, proceeding through blades 57 on the left side of member 31 through the winding region, and thence to the right side via the right-hand blades 57 and out through the ports 54 in the right side wall 55. It will be noted that the fan elements 57 are carried by the drive member and are therefore in constant rotation, thus assuring cooling, regardless of the output speed and assuring maximum cooling effectiveness, particularly at times of greatest slip.

To complete the description of important parts shown on FIGS. 2 and 3, a tachometer generator 60 is shown mounted on the arm 51 and connected by belt means 61 to a drive pulley 62 fixedly carried by the hub 47 of the driven member 39. Thus, the output of tachometer generator 60 always correctly reflects the output or driven speed of the member 39 and, hence, of the spindle 11.

In FIGS. 4 and 5, I illustrate further features of the invention, particularly in regard to the development of the excitable winding means 41. As noted above, this winding means features distributed development along the face of core iron, such distribution being symmetrical on both angular sides of the central pole face area 65 thereof. For the particular form shown, all laminations of the core iron 42 are suitably slotted and divided to provide six windings of the variety depicted for one winding in detail in FIGS. 4 and 5, each of such windings occupying substantially 60° about the member 39. The winding shown comprises seven coils 66—67—68—69—70—71—72 laid in successive slots symmetrically disposed on opposite sides of the central pole face area 65. A typical turns development in one of these slots is illustrated at 73 in FIG. 5 (insulation between turns being omitted, for clarity of illustration), there being 22 turns shown for each coil. All coils are connected in series (by means not shown), and adequate mechanical support and spacings of the projecting parts of each coil is provided by spacers, as at 74, the individual coils being suitably taped and insulated, as suggested at 75. Successive adjacent windings for poles adjacent the pole 65 will be understood to be of similar development, the winding to the left of that in FIG. 5 having an outer coil (not shown) received in the slot 76, and the winding to the right of that in FIG. 5 having an outer coil (not shown) received in the slot 77.

My basic power-delivery or control circuit is illustrated in detail at 80 in FIG. 6, for one direction or phase of the line voltage; and in order to provide full-wave rectified excitation of the load winding 41, the circuit 80 is duplicated at 81 for the other phase of the line voltage, corresponding parts being given similar designations in each of the circuits 80—81. Circuits of the type described at 80—81 have been previously covered in detail in certain of my pending patent applications, including application Serial No. 640,273, filed February 14, 1957, now Patent No. 2,941,137. The showing of winding 41 in FIG. 6 will be understood schematically to represent all the interconnected excitable windings, as indicated individually in FIGS. 4 and 5 and provided in multiple about the rotatable member 39, said windings being connected in series, for D.-C. excitation by circuits 80—81.

I term my basic circuit 80 a firing control circuit largely because, in use of the invention, the prime element relied upon for delivery of power to the load has been a gaseous-discharge device, such as an ignitron or thyratron. Basically, however, the circuit 80 is merely a relay, which may be transiently closed and opened for adjustably varied fractions of the electrical cycle of the particular phase with which it is concerned. In said copending application, firing in the control circuit utilizes an ignitron, triggered by a thyratron, but in the form presently shown, the thyratron V–3 alone determines application of line power to the load 41.

The control device (thyratron) V–3 may be viewed as having an input circuit defined between the grid connection 92 and the cathode connection 93, and an output circuit defined between the anode connection 94 and the cathode connection 93. Line power for the output circuit 93—94 is derived at $L_1$—$L_2$ and is supplied by transformer T-1 (having primary T-1P, and secondary T-1S) to the anode circuits of thyratrons V-3, V-3' of control circuits 80—81, respectively, the midpoint of secondary T-1S being connected to the cathodes of these tubes by way of the load 41. For purposes which will later be explained, current transformers CT-1 and CT-2 are shown in the lines $L_1$ and $L_2$ to transformer T-1.

The control circuit 80 in FIG. 6 happens to be concerned with the "IN" side of the supply voltage available from transformer secondary T-1S, and for purposes of description, this may be termed the reference phase for circuit 80. Basic control voltage for the input circuit 92—93 is developed by non-linear summation of the voltage from this reference phase and of voltage from the opposite phase. Inverted reference-phase voltage is developed at winding T-9S, being the secondary of transformer T-9, and inverted opposed-phase voltage is developed at winding T-10S, being the secondary of transformer T-10. The primaries T-9P and T-10P for these two transformers are shown in the circuit of FIG. 7 and are supplied with variously phase-shifted voltages for control purposes, as will be described.

In the arrangement shown, the opposed-phase voltage (winding T-10S) is added to the control-circuit voltage only at such times as reference-phase voltage (winding T-9S) shall exceed negatively biased opposed-phase voltage (winding T-10S). Constant negative bias (i.e. terminal 95 of winding T-10S, biased negatively with respect to terminal 96 of winding T-9S) is developed by rectifier V-5 operating from a transformer secondary T-5S, the primary T-5P of which is shown in FIG. 7; smoothing elements 97—98 assure development of a steady bias voltage. In order that the biased opposed-phase voltage may be added to the reference-phase voltage only when the reference-phase voltage exceeds the opposed-phase voltage, a non-linear resistance, such as the rectifier V-4, is provided between the other terminal 99 of the opposed-phase winding T-10S, and the control-circuit grid connection 92.

Reference-phase voltage supplied at T-9S and opposed-phase voltage supplied at T-10S are adjustably phase-shifted voltages which may be developed by synchro-generator means, as disclosed in said copending application, but which in the form shown are developed purely electronically, that is, without mechanical motion, by means of the circuit of FIG. 7.

The phase-shift circuit of FIG. 7 derives its supply from the line by way of transformer T-2 (having a secondary midpoint 91) and comprises essentially two gas-discharge devices or thyratrons V-1 and V-2 having output circuits connected across the respective halves of a phase-shifting network; said network is shown to comprise essentially the capacitative arm, including capacitor 100 and resistor R-12, and a resistive arm, including resistor R-11 and potentiometer P-1, said arms being connected at the point 90. It will be understood that the magnitude of adjustment at potentiometer P-1 determines the basic phase relation between the line voltage and voltage across 90—91.

The control circuits for tubes V-1 and V-2 are basically supplied by a transformer T-7, having its primary connected to track the phase-shifted voltage (across 90—91), and having separate secondary halves connected in the respective control circuits of tubes V-1 and V-2. Thus, the tubes V-1 and V-2 are driven in push-pull, in accordance with the extent of instantaneous phase shift.

Further adjustment of instantaneous firing times for the tubes V-1 and V-2, for any particular cycle of operation, is determined by the net bias applied to the grid-cathode circuits of these tubes by a series of summing resistors R-2, R-3, R-4, R-5, R-6, across which various positive or negative bias-component (i.e. effectively feedback control) voltages are developed, as will be pointed out. The actual firing pulses in the output circuits of tubes V-1, V-2 are transmitted to the control circuit of FIG. 6 by way of transformers T-9 and T-10 (for the case of circuit 81), and by way of transformers T-11 and T-12 (for the case of circuit 81). The voltages appearing across the summing resistors R-2 . . . R-6 will be described in greater detail after coverage of the overall circuit organization and its operation, in terms of developing basic rotation in the lathe spindle 11.

FIG. 8 shows basic starting controls for excitation of the control circuits to operate the coupling unit 12, it being assumed that the motor 10 has been previously excited and is continuously running. Thus, the main-line switch 101 and the control-power switch 102 must first be closed to excite the basic relays, commencing with the time-delay or tube warm-up relay TR-1 having normally open contacts TR-1-1 which close to excite a first control-relay winding CR-1 only after lapse of a suitable protective interval to allow for tube warm-up, during which interval a suitable red indicator 104 is energized. Upon pick-up of relay TR-1, its normally open contacts TR-1-1 close to display a green or safe-running indicator 103, and at the same time its normally closed contacts CR-1-3 open to extinguish the red or tube warm-up indicator 104. Simultaneously, further contacts CR-1-2 of the control relay CR-1 close to complete the circuit to the main relay MR, having contacts MR-1 which then close to connect the windings 41 of coupling unit 12 into the control circuits 80—81 of FIG. 6.

To place the apparatus in readiness for a run, the lathe-run switch 105 is closed, thus exciting the winding of a second control relay CR-2 having normally open contacts CR-2-1 and CR-2-2 which close to apply line voltage to the anodes of thyratrons V-1, V-2 of FIG. 7. At the same time, the winding TR-2 of a second time-delay relay is excited through the normally closed contacts CR-3-3 of a third control relay CR-3. After the lapse of the protective interval of relay TR-2, its normally open contacts TR-2-1 close to complete the circuit to relay R-3, and the latter is held in as the run relay by means of its normally open hold-in contacts CR-3-1.

With the apparatus described, and having thrown the switches 101—102—105, the circuits of FIGS. 6, 7 and 8 are all in operation; and, depending upon the adjustment at potentiometer P-1 (to determine basic phase shift) and also upon the net bias voltage developed across the resistors R-2, R-3, R-4, R-5, R-6 (to determining instantaneous modification of this basic phase shift), a given coupling coefficient will have been developed in the coupling device 12 of the invention. Since the motor 10 is, as indicated above, already in continuous running condition, the lathe spindle 11 will now be driven, as determined by the instantaneous coupling coefficient at 12. With such rotation, the tachometer generator 60 develops a voltage (proportional to spindle speed), which will be seen in FIG. 7 to be applied across potentiometer P-4 and, in accordance with the setting of such potentiometer P-4, to be applied as a component of bias voltage across the summing resistor R-4. The sign of this connection is such as to produce increasing effective negative bias across R-4 (in terms of control-circuit operation for tubes V-1 and V-2) for greater speeds of lathe-spindle rotation. The described connections for tachometer generator 60 may thus be viewed as effectively creating a negative-feedback voltage responsive to output rotational speed to determine a selected upper limit for driven speed, the selection being of course as adjusted at P-4.

A second negative-bias control is effected across the resistor R-2 utilizing basically a line voltage derived from the secondary T-6S of transformer T-6, shown with its primary T-6P connected across half the output of line transformer T-2 in FIG. 7. The line voltage available at winding T-6S is full-wave rectified at 110 and applied across potentiometer P-2, the setting of which determines the extent of negative-bias voltage developed across resistor R-2. The adjustment at P-2 may thus be viewed as a means of selectively adjusting the control system to determine a maximum permissible clutch action for a particular job setup. In other words, the greater the negative-bias voltage component selected by the setting of P-2, the less will be the permissible clutch action by virtue of other control elements of the system.

A third component of negative voltage in the biasing circuit is developed across resistor R-3, as determined by the setting at potentiometer P-3. This voltage is derived from current transformers CT-1 and CT-2 which are seen in FIG. 6 to sample line current in the main supply line $L_1$—$L_2$ to the control circuits 80—81. The voltage thus sampled by transformers CT-1 and CT-2 is full-wave rectified at 111 for application to potentiometer P-3, so that the current associated with instantaneous coupling torque in the device 12 may provide an upper safety limit of coupling torque, regardless of other adjustments.

A fourth component voltage in the biasing circuit is established across resistor R-5, and in this case a positive bias-voltage component is developed in response to motor current, by way of current transformers CT-3 and CT-4 in the line-supply connections to the motor 10 (FIG. 1). The outputs of current transformers CT-3 and CT-4 are applied to potentiometer P-5 by full-wave rectifying means 112 in the manner described for the case of potentiometer P-3, but as noted above, the sign of the rectified voltage is in the opposite direction in order to develop a positive voltage across resistor R-5. This positive voltage is, as indicated, responsive to motor current, and it therefore provide an increased coupling coefficient or output torque (at 12) as motor load increases. In other words, the voltage across resistor R-5 serves to maintain a given spindle speed even though the load may be increasing, but this corrective influence must necessarily be within the above-mentioned output-torque safety limit, governed by the negative voltage developed across resistor R-3.

It will be noted that the connection of potentiometer P-5 across resistor R-5 includes the normally open contacts CR-3-3 of control relay CR-3. This particular bias-component circuit therefore cannot be effective until lapse of the protective interval governed by relay TR-2.

In addition to the automatic protective features described above in connection with the various negative and positive bias-component circuits, there is shown provided across the fifth summing resistor R-6 a voltage proportional to tool position, as developed by the instantaneous position of the potentiometer P-6; for the case of the rack-and-pinion pick-off 30' in FIG. 1, potentiometer P-6 is preferably of the multiturn variety, capable of linearly following a number of rotations of the pick-off elements 30' and of thus tracking the maximum possible travel of the tool 21 relative to the lathe-spindle axis. The voltage source used for this purpose may be derived by transformer T-4 having its primary T-4P connected across half the output of line transformer T-2 (FIG. 7) and having its secondary T-4S supply a full-wave rectifier 113 connected across potentiometer P-7. The setting of potentiometer P-7 is selectively available and should be calibrated to the particular machine (and type of work and tool) to which the control apparatus of the invention is applied, in order that a proper proportionality of voltage across R-6 may be developed for various cutting radii. It will be understood that the bias-voltage component developed across resistor R-6 effectively duplicates tool or work positions and that such voltage will increase negatively or decrease positively as the cutting radius shortens, all for the purpose of maintaining constant cutting speed, regardless of the instantaneous radius of cut.

It will be seen that I have described an improved variable speed coupling device lending itself to a variety of applications and in particular to situations in which the torque required for driving will vary considerably and in which the drive speed must also necessarily vary considerably throughout a particular cutting operation, as, for example, on a contour lathe or boring mill. In such machines, the operating characteristics are not the same; indeed, it is found that they vary depending upon the kind of work and the kind of tool. The present invention provides great facility in permitting manual selection of adjustment and compensation factors unique to the character of the work (or tool) and to the character of the machine, all with a view to optimizing productivity of the machine, as well as reducing set-up time. My arrangement avoids the erratic operation that is sometimes encountered due to variations in mechanical advantage during the progress of work on a given machine, by adapting the machine speed and/or torque to the instantaneous requirements necessitated by quality control. Rapid response to all control functions is assured by the particular design of winding development for each pole on the driven element, whereby high magnetic-flux density at pole faces is assured and maximum flux transfer between stator and rotor elements achieved.

While I have described the invention in detail for the preferred form shown, it will be understood that modifications may be made within the scope of the invention as described in the claims which follow.

I claim:

1. In combination, prime mover means including a continuously running rotary output, a machine having a rotatable element to be driven by said prime mover means, and a variable speed and variable torque coupling device, said coupling device comprising two relatively rotatable members, one of said members being connected for continuous drive by the rotary output of said prime mover means, the other of said members being connected in driving relation with said rotatable machine element, excitable magnetizing means including a part carried by one of said members and magnetic induction means carried by the other of said members, said magnetizing means including excitable winding means, and an automatically self-regulating direct-current control supply connected to said excitable winding means, said self-regulating control supply comprising an alternating current source, rectifier means connecting said source to said excitable winding means, and a phase-sensitive control for said rectifier means; said phase-sensitive control comprising a phase-shifter having a first connection to said source and having a second connection across which appears a voltage displaced in phase from that of said source, a power amplifier device having an input circuit supplied by one of said first and second connections and having an output circuit supplied by the other of said first and second connections, and automatically compensated direct-current bias means in the input circuit of said power amplifier device, said bias means comprising a plurality of serially connected summing resistors, and separate direct-current generator means connected across successive of said resistors, each such generator means being connected to a different functional part of said combination, whereby the individual operation of such functional part automatically partially determines the coupling coefficient of said coupling device.

2. The combination described in claim 1, in which said phase shifter comprises a resistance element and a capacitance element connected across said alternating current source, said resistance element being adjustably variable, whereby a referenc coupling cofficient may be manually selected.

3. The combination described in claim 1, in which one of said direct-current generator means comprises a rectifier connected for supply by said alternating current source, and a selectively variable resistance connecting said rectifier to one of said summing resistors in negatively biasing relation with the input circuit to said power amplifier device, whereby the setting of said variable resistance determines the maximum instantaneous torque that may be exerted by said coupling device.

4. The combination described in claim 1, in which one of said direct-current generator means comprises a current transformer connected to respond to instantaneous line current in said alternating-current supply, a rectifier driven by the output of said transformer, and a selectively variable resistance connecting said rectifier to one of said summing resistors in negatively biasing relation with the input circuit to said power amplifier device, whereby the setting of said variable resistance determines the extent to which instantaneous line current shall limit the coupling coefficient of said device.

5. The combination described in claim 1, in which one of said direct-current generators comprises a tachometer generator driven by said other rotatable member, and a selectively variable resistance connecting said tachometer generator in negatively biasing relation with the input circuit to said power amplifier device, whereby the setting of said variable resistance determines the extent to which instantaneous speed of said rotatable machine element shall limit the coupling coefficient of said device.

6. The combination described in claim 1, in which said prime mover element is an electric motor and means continuously exciting the same, in which one of said direct-current generators comprises a current transformer connected to respond to instantaneous line current in said electric motor excitation means, a rectifier driven by the output of said transformer, and a selectively variable resistance connecting said rectifier to one of said summing resistors in positively biasing relation with the input circuit to said power amplifier device, whereby the setting of said resistor may determine the extent to which increasing motor load shall increase the coupling coefficient of said device.

7. The combination of claim 1, in which one of said rotatable members has a greater moment of inertia than the other and in which said one rotatable member is connected in driving relation with said rotatable machine element.

8. The combination of claim 1, in which said rotatable member having said excitable winding means includes a core element presenting a plurality of angularly spaced pole faces to said other rotatable member, and in which said winding means includes for each such pole face a plurality of turns linking progressively greater areas of said core element, symmetrically on opposite angular sides of the effective center of each such pole face.

9. The combination of claim 8, in which the outer turns of adjacent pluralities associated with adjacent pole faces are immediately adjacent, with a minimum of core material therebetween.

References Cited in the file of this patent

UNITED STATES PATENTS

| | | |
|---|---|---|
| 1,685,613 | Onsrud | Sept. 25, 1928 |
| 2,389,757 | Bickel | Nov. 27, 1945 |
| 2,600,988 | Greene | June 17, 1952 |
| 2,641,759 | Jaeschke | June 9, 1953 |
| 2,733,660 | Towle | Feb. 7, 1956 |
| 2,850,654 | Jaeschke | Sept. 2, 1958 |

FOREIGN PATENTS

| | | |
|---|---|---|
| 23,637 | Great Britain | Nov. 21, 1901 |